April 21, 1959
L. T. GOOLDY
2,883,511
HUMIDIFIER
Filed April 17, 1958
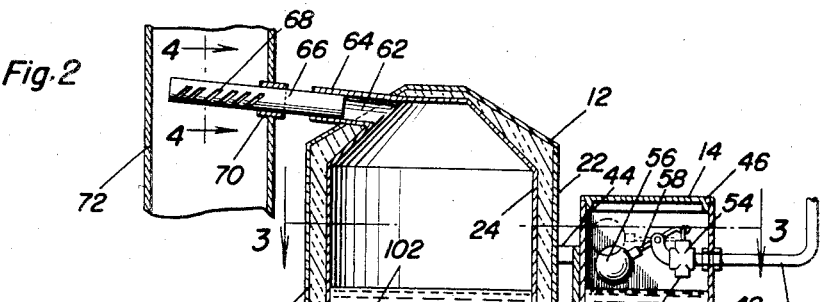
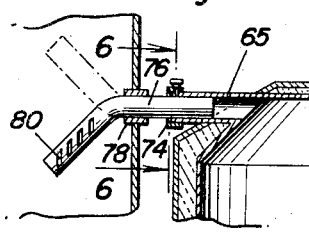
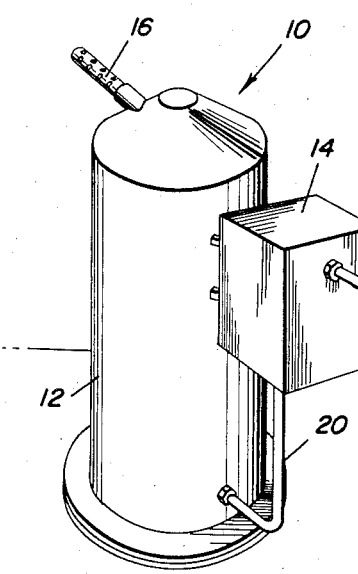
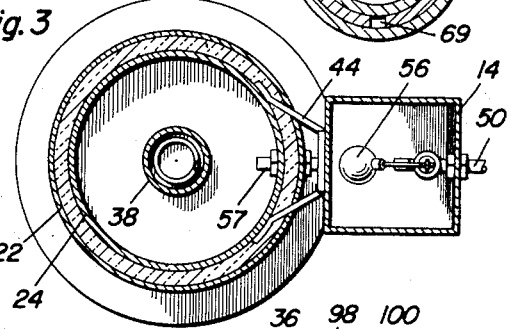
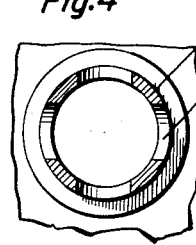
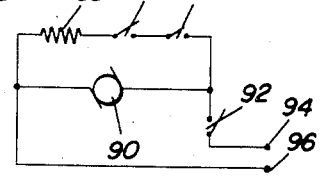
Layton T. Gooldy
INVENTOR.

United States Patent Office 2,883,511
Patented Apr. 21, 1959

2,883,511
HUMIDIFIER

Layton T. Gooldy, Bloomington, Ind.

Application April 17, 1958, Serial No. 729,093

1 Claim. (Cl. 219—38)

This invention relates generally to means for regulating humidity.

It is widely recognized that physicians recommend that room relative humidity should be kept at approximately 50 percent for optimum health conditions. Further, it is appreciated that greater than normal humidity will allow the room temperature to be kept slightly lower with no uncomfortable affects, significantly lessening fuel costs. Still further, the home keeper is undoubtedly well aware that properly controlled humid conditions prevent furniture and other household items from drying out. Accordingly, it is the principal object of this invention to provide a humidity control system particularly adapted to increase and control the normal humidity conditions in the home, office or factory.

It is a further object of this invention to provide a practical and novel means for introducing regulated moisture into the air.

It is a further object of this invention to provide practical and relatively inexpensive apparatus for increasing and controlling local relative humidity.

In accordance with the above stated objects, below is particularly described a novel and improved construction for increasing and controlling relative humidity. The apparatus initially includes an insulated integral heating chamber having an electrically energizable heating element carried in the bottom thereof. Further, the heating chamber supports externally thereof a float chamber which communicates with a water supply in the heating chamber. The communication with the heating chamber assures the establishment of a common water level in the respective chambers. The float chamber further includes a conventional float valve adapted to control the common water level. The communication between the two chambers includes piping which passes through respective apertures in each of the chambers. The heating chamber aperture is located at the bottom thereof so as to prevent heated water from entering the float chamber to assure that the float portion of the float valve remains in cold water. It should be apparent that it is desirable for the float to remain in cold water so as to decrease the tendency to lime up and corrode. A vapor outlet also communicates with the heating chamber and is adapted to pass vapor through a duct system or alternatively through the plenum chamber of a furnace so that it may be circulated by the furnace fan. Further, it is contemplated that a switch be included in series with the heating element which is responsive to the water flow continuity. That is, upon a cessation of the water supply, this normally closed switch will open the circuit to prevent further heating of the heating element. It is also contemplated that a humidistat be included in series with the heating coil so as to prevent over humidification of the air. In systems utilizing the furnace fan, it is felt that the heating element in combination with the two switches above noted should be placed in parallel with the fan motor so as to operate automatically in conjunction therewith.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an outside perspective view illustrating the structural relationships of the invention;

Figure 2 is a sectional view showing the relative relationships between the elements of the invention;

Figure 3 is a sectional view taken substantially along the plane 3—3 of Figure 2;

Figure 4 is a sectional view taken substantially along the plane 4—4 of Figure 2;

Figure 5 is a sectional view illustrating an alternative vapor outlet arrangement;

Figure 6 is a sectional view taken substantially on the plane of 6—6 of Figure 5; and Figure 7 illustrates a contemplated electrical circuit to be used in conjunction with the invention.

With continuing reference to the drawings and initial reference to the perspective view of Figure 1, the numeral 10 generally represents the humidity apparatus comprising this invention and including a heating chamber 12 and a float chamber 14 supported by the heating chamber 12 externally thereof. A vapor outlet 16 is shown communicating with the heating chamber 12 while a water inlet 18 is illustrated as communicating with the float chamber 14. Piping 20 communicates the two chambers to establish common water levels therein.

Referring now more particularly to the details of the invention, the heating chamber 12 includes a one-piece cylindrical outer wall 22 and an inner concentric wall 24. The volume between the walls is filled with a good heat insulator 26 of any conventional type. The concentric walls 22 and 24 terminate at their lower portions in circular flanges 28 and 30 respectively. The flanges 28 and 30 are welded one to the other to secure the proper relationship between the concentric walls. A circular bottom portion 32 having an upstanding peripheral wall 34 is welded to close the bottom of the heating chamber. An aperture in the center of the bottom 32 passes a heating element 36 which is enclosed in a conductive cylinder 38. The heating element 36 is adapted to be energized electrically through a pair of leads 40 and 42.

Externally supported by brackets 44 on heating chamber 12 is a float chamber 14 which is merely a tank of welded construction having a removable top 46. A first aperture in wall 48 of the float chamber 14 passes a pipe 50 which is connected to a water supply (not shown). The pipe 50 terminates in a spout 52. The water flow through the pipe 50 may be controlled by a conventional float valve 54 having a float 56 supported on a pivotally mounted arm 58. An aperture in the bottom 55 of the float chamber 14 is connected to a pipe 57 which communicates with the interstices of the heating chamber proximate the bottom thereof as at 60. It is to be noted that the pipes 50 and 57 are properly sealed at the various apertures.

An aperture 62 is formed in the upper portion of the heating chamber 12. Surrounding the aperture is a collar 64 which is inclined at a slight angle relative to the horizontal. The collar 64 seats a pipe portion 66 which has diagonally cut slots 68 therein at 90° angles about the circumference of the pipe 66. The pipe 66 is supported in an aperture by a sleeve 70 carried by a duct system as 72.

If the teachings of this invention are to be utilized in combination with a furnace, the vapor outlet of the heating chamber 12 may communicate with the plenum chamber of the furnace so that the furnace fan can distribute the vapor properly. More particularly, in Figure 5 a collar 65 is shown forming the vapor outlet of the heating chamber 12. The collar 65 contains a slot 67. Seated around the collar 65 is a flanged sleeve 74. The flanged sleeve 74 is affixed to an elbow pipe 76. The elbow pipe proceeds through a sleeve 78 and is directed to the plenum chamber of a conventional furnace. The elbow pipe has diagonally cut slits 80 to facilitate the vapor dispersion through the pipe. It is to be noted that the sleeve 74 has a housing 82 fixed thereon as by welding 84. A spring 86 is carried in the housing and a pin 88 is concentrically fitted in the spring. The spring 86 is affixed to the pin 88 at respective bottom portions. As is shown in the dotted line alternative position in Figure 5, the elbow pipe 76 is adapted to be directed upwardly or downwardly so as to be properly utilized with up draft or down draft furnaces. It should be apparent that the flow pipe may be fixed in either one of two selective positions by the pin and spring mechanism 88 and 86. The pin 88 is accommodated in the slot 67 or an opposed slot 69 and prevents relative turning between the elbow pipe 76 and the collar 65. In order to change the position of the elbow pipe 76, it is only necessary to exert an upward force on the pin 88 to compress the spring 76 to remove the lower portion of the pin 88 from the slot 67 or 69. In the absence of an exerting force, the spring 86 will properly force the pin 88 into the desired slot 67 or 69.

In the utilization of the device illustrated in Figure 2, the heating element 36 may simply be connected across the conventional line voltage. Proper control switches will of course be placed in series with the heating element. The utilization of these switches will be understood from a description of Figure 7 which is the circuit diagram for the circuit to be utilized in conjunction with the apparatus more particularly described in Figure 5. The numeral 90 designates the fan motor of the furnace which is electrically connected through a main switch 92 to a pair of line voltage terminals 94 and 96. Electrically connected in parallel with the fan motor 90 is a heating element 36. Serially connected to the heating element 36 is a humidistat 98 which may be selectively set to open upon the establishment of a predetermined humidity. The switch 98 would be normally closed. However, a second switch 100 is likewise normally closed and is intended to be mechanically or electrically linked with the water supply (not shown) so that the switch 100 would open upon a stoppage of the water flowing through pipe 50.

In operation, the heating element 36 is adapted to vaporize water 102 in heating chamber 12. The water 102 is received through pipe 57 from float chamber 14. It is particularly to be noted that the inlet 60 is positioned at the bottom of the heating chamber 12 so that heated water 102 within heating chamber 12 will not substantially transfer heat through the pipe 57 to the water in the float chamber 14. It is particularly desirable for the water in float chamber 14 to remain cold to decrease the tendency of the float 56 to lime up and corrode. Of course, it is desired that this tendency be eliminated as inexpensively as possible. The heating element 36 vaporizes the water 102 and the vapor escapes through the aperture 62 to the pipe 66 and through diagonally cut slots 68. It is to be noted that the inclination of the collar 64 and pipe 66 allow for condensed vapor to fall back into the heating chamber 12.

The operation of the embodiment of Figure 5 is identical except for the fact that a furnace fan 90 is utilized to distribute the vapor. The humidistat 98 assures the user that the air humidity will not increase beyond the desired level. Further, the switch 100 prevents overheating of the heating element 36 in that the heating element is electrically disconnected from the line terminals 94 and 96 if the water supply is shut off.

In summary, a home humidifier has been described which is clearly efficient and practical and inexpensive and is adaptable for utilization with various heating elements including gas and electric heaters.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

Apparatus for the establishment of proper humidity conditions comprising a heating chamber, a heating element in said heating chamber, a vapor outlet communicating with said heating chamber, a float chamber carried externally of said heating chamber and communicating with said heating chamber for establishing common water levels in said heating chamber and said float chamber, means connecting said float chamber to said water supply, and level control means carried in said float chamber for regulating the said common water level, said vapor outlet including a pipe having a series of diagonally cut slots therein for facilitating proper vapor disposal, said vapor outlet pipe being inclined relative to the heating chamber for permitting condensed vapor to fall back into said heating chamber.

References Cited in the file of this patent

UNITED STATES PATENTS

| | | |
|---|---|---|
| 1,756,053 | Colton | Apr. 29, 1930 |
| 2,061,148 | Fischer | Nov. 17, 1936 |
| 2,062,613 | Schleimer | Dec. 1, 1936 |
| 2,162,462 | Reid | June 13, 1939 |
| 2,182,836 | Zummach | Dec. 12, 1939 |
| 2,347,490 | Legeman | Apr. 25, 1944 |
| 2,443,417 | Duncan | June 15, 1948 |